United States Patent [19]
Mainquist et al.

[11] Patent Number: 5,829,560
[45] Date of Patent: Nov. 3, 1998

[54] VALVE ASSEMBLY IN A HYDRAULIC CONTROL FOR A RATIO CONTROLLER IN A POWER TRANSMISSION

[75] Inventors: James Kevin Mainquist, Troy; Tracey Lynn Myers, Detroit; David Allen Blenc, Shelby Township, Macomb County, all of Mich.

[73] Assignee: General Motors Corporation, Detroit, Mich.

[21] Appl. No.: 856,832

[22] Filed: May 15, 1997

[51] Int. Cl.⁶ .............................. B60K 41/22; F16K 15/02
[52] U.S. Cl. ...................... 192/3.57; 74/606 R; 137/540; 192/109 F
[58] Field of Search ................... 137/540; 192/109 F, 192/3.51, 3.57; 74/606 R; 475/128

[56] References Cited

U.S. PATENT DOCUMENTS

| | | | |
|---|---|---|---|
| 2,929,401 | 3/1960 | Cowan | 137/516.29 |
| 3,363,646 | 1/1968 | Foreman | 137/540 |
| 4,350,179 | 9/1982 | Bunn et al. | 137/540 |
| 4,756,213 | 7/1988 | Mainquist et al. | 477/62 |
| 5,299,598 | 4/1994 | Quartana et al. | 137/540 |
| 5,752,546 | 5/1998 | Yamashita | 137/540 |

*Primary Examiner*—Rodney H. Bonck
*Attorney, Agent, or Firm*—Donald F. Scherer

[57] ABSTRACT

A hydraulic control has a valve body assembly in which a plurality of control valves are contained. The valve body has separate structures which are secured together by fasteners. Separator plates are positioned between the structure levels to establish flow passages and sealing elements between fluid passages in the separate structures. The separator plate has two conical valve seats formed therein which cooperate with two pintle valves to control the flow of hydraulic fluid to and from a ratio controller within a power transmissions.

2 Claims, 3 Drawing Sheets

5,829,560

VALVE ASSEMBLY IN A HYDRAULIC CONTROL FOR A RATIO CONTROLLER IN A POWER TRANSMISSION

TECHNICAL FIELD

This invention relates to control valve structures in a hydraulic control for a power transmission.

BACKGROUND OF THE INVENTION

Control valve assemblies for power transmissions have a multicomponent valve body in which a plurality of valve elements are installed. Interconnecting passages or "worm tracks" are formed in the valve body structures to direct fluid between the valve elements and the transmission devices to be controlled. A separator plate is secured between adjacent valve body components or structures to prevent undesirable fluid flow between the "worm tracks" of adjacent components.

Openings are formed in the separator plates to conduct fluid between "worm tracks", when desired. Where it is desired to control the direction of fluid flow through the separator, such as fluid to and from a friction clutch element, ball check valves are used. The ball portion seats against a sharp edge formed on the separator plate. This seating structure establishes line seal contact between the ball and the separator plate.

When the ball lifts off the seat on the separator plate to establish fluid flow to the transmission, the fluid flow rate is essentially uncontrolled during the initial portion of flow through the valve. This permits large flow rates that affect the engagement time of the transmission device, for example, a friction clutch, particularly under engine idle conditions during a neutral to drive shift.

To control the pressure rise and fluid flow, it is generally necessary to incorporate an accumulator or electronically controlled flow valve into the control system. These elements increase the space requirement for the hydraulic control and also increase the cost of producing such a control.

SUMMARY OF THE INVENTION

It is an object of the present invention to provide an improved control valve structure in a power transmission whereby the fluid flow to an from a friction device is controlled.

In one aspect of the present invention, a control valve assembly has a pair of housings secured together with a separator plate therebetween. The separator plate provides a seal surface between the housings and through proper positioning of apertures, provides flow channels between the housings. The separator plate also has conical valve seats formed therein for cooperation with a pair of pintle valves each having a conical valve surface. With the cooperation of the seat and valve surface, improved pressure and flow control is attained downstream of the valve elements. The conical valve seat and surface provide a controlled valve opening space, such that a minimum of fluid flow can be achieved to control the downstream pressure rise and therefore the engagement of a friction clutch. A valve seat is easily formed in the separator plate at the instance of manufacture, while other portions of the separator plate are having die cutting operations performed thereon.

In another aspect of the present invention, two pintle valves and conical seats are incorporated in a transmission valve body to control the engagement flow to a friction device and the disengagement flow from the friction device. One of the valves controls input flow and the other controls outlet flow.

The use of pintle type poppet valves permits improved engagement control of a clutch during a neutral to drive or first ratio interchange. This interchange occurs at engine idle when the operator moves the manual lever from neutral to drive which is commonly termed a "garage shift". Torque disturbances can occur which will be sensed by the operator if the clutch engagement is too rapid. The pintle type poppet valves provide a valve opening flow area that encourages low flow rates at the low control pressures that are present at engine idle and discourages torque disturbances.

DESCRIPTION OF AN EXEMPLARY EMBODIMENT

Figure 1:
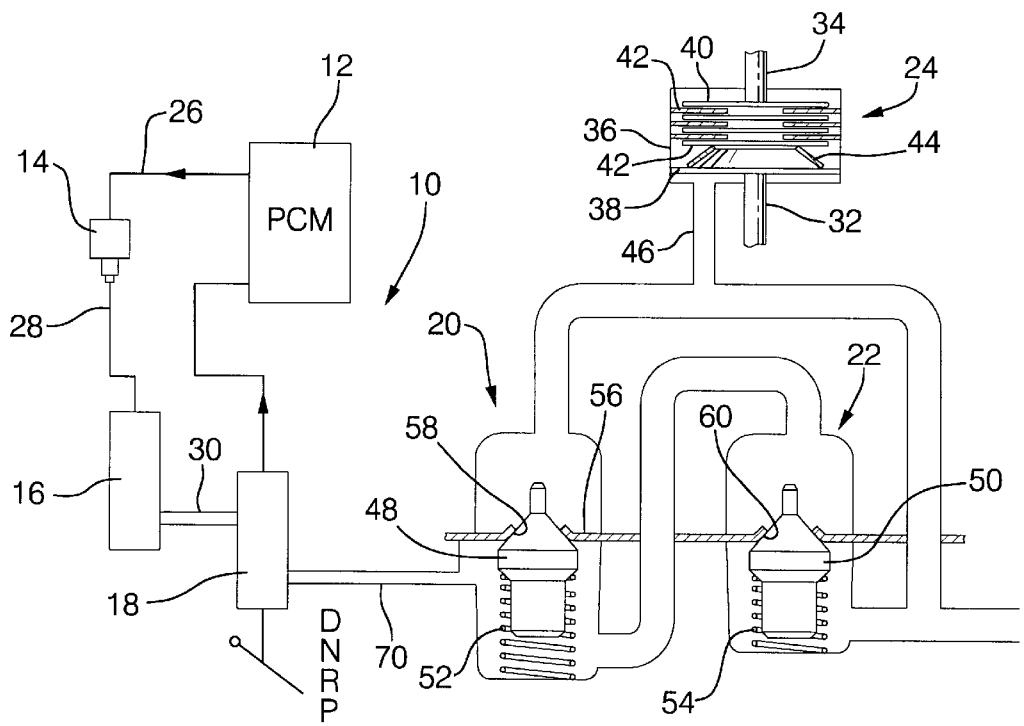
FIG. 1 is a diagrammatic representation of a portion of a transmission control incorporating the present invention.
Figure 2:
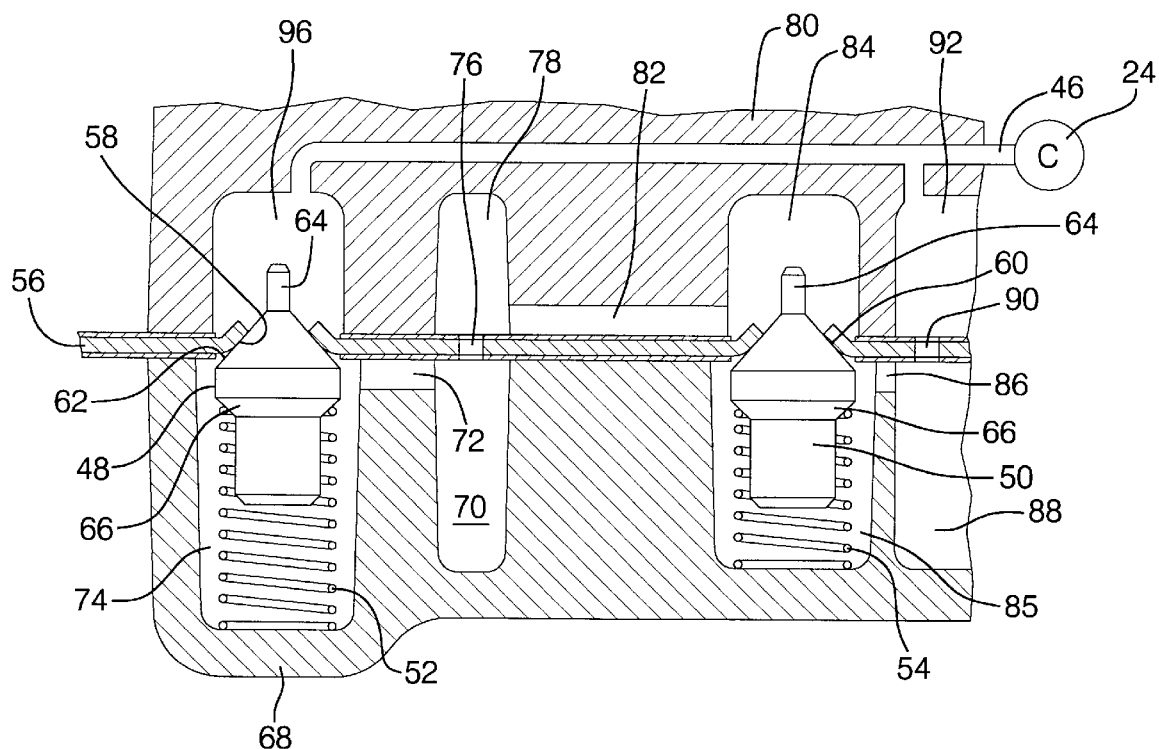
FIG. 2 is a cross-sectional elevational view of a portion of a transmission control assembly.

Referring to the drawings, and in particular FIGS. 1 and 2, there is seen a hydraulic control structure 10 having an electronic control module 12, a solenoid control module 14, a positive displacement pump and pressure regulator valve 16, a manual selector valve 18, and a pair of pintle valves 20 and 22. The pintle type poppet valves 20 and 22 supply fluid pressure to and from a selectively engageable friction clutch 24.

The electronic control module 12 is a conventional electronic mechanism and may include a programmable computer which incorporates the necessary functions and commands to provide control of the hydraulic system for a transmission. The solenoid control module 14 is a conventional solenoid valve which receives electronic signals through a line 26 from the control unit 12 and in turn controls fluid pressure in a passage 28 in accordance with the electronic signals received. The fluid pressure in passage 28 is the pilot or control pressure for the pump and regulator valve 16.

The pump and regulator valve 16 are conventional devices which are well known in the art of transmission controls. The pump utilizes a positive displacement pump which delivers a substantially fixed amount or volume of fluid flow for each revolution of the pump. The regulator valve is an overflow type regulator valve which receives a control signal in passage 28 and determines the maximum downstream or system pressure which will be delivered to a main passage 30 which is connected with the manual selector valve 18.

The manual selector valve 18 is a conventional operator control which permits the operator to manipulate the transmission between park "P", reverse "R", neutral "N" and drive "D", depending upon the drive arrangement the operator desires.

The friction clutch 24 is a conventional fluid operated friction device having an input shaft 32 and an output shaft 34. The input shaft is drivingly connected to a housing 36 in which is slidably disposed a fluid operated piston 38. A plurality of friction or clutch plates 40 and 42 are disposed within the housing 36 and are alternately splined to be drivingly connected with the housing 36 and with the output shaft 34. The use of these devices as torque transmitters and ratio control units is well known.

A return or Belleville spring 44 is disposed between the piston 38 and one of the friction plates 42 to provide a conventional accumulator or take-up member within the clutch 24. As is well known in such devices, the return spring 44 is useful when the clutch is to be disengaged and the pressure relieved on the piston 38. Under these conditions, the return spring pushes the pressure plate back from the friction plates thereby disengaging the frictional engagement of the clutch plates 40 and 42.

Piston 38 is slidably disposed in the housing 36 and cooperates therewith to provide a fluid pressure chamber which is connected to a fluid passage 46. The fluid passage 46 is connected to the poppet valves 20 and 22 and is operable to deliver fluid pressure via valve 22 to the clutch 24 and from the clutch 24 to exhaust via valve 20.

The valves 20 and 22 each have a poppet valve member 48 and 50, respectively, which are urged by respective springs 52 and 54 into seating engagement with a separator plate 56. The separator plate 56 has a pair of conical seats 58 and 60 which form valve seats for the poppet members 48 and 50, respectively. This is better seen in FIG. 2.

As seen in FIG. 2, the valves 48 and 50 are essentially identical, such that a description of one will serve the description for both. Each valve has a conical section 62 which ends in a pintle portion 64. The pintle portion 64 ensures the valve is properly guided to the seat and establishes a flow area with the valve seat when the valve is fully opened. The valve also has a spring seat portion 66 against which the springs 52 and 54 are compressed. The springs 52 and 54 also seat in a valve housing or valve body 68.

It should be noted that the distance from seat 66 on valve 50 to the valve housing 68 is less than the distance between the seat 66 on valve 48 and the housing 68. This permits the spring force seating the valve 50 to be greater than the spring force seating the valve 48 while the same basic spring can be utilized in both structures. For example, the spring 52 might be compressed to have a seating force of X pounds while the spring 54 will be compressed at assembly to have a seating force of X+Y pounds. Thus, more pressure will be required to unseat the valve 50 than is required to unseat the valve 48. This reduces the number of parts in inventory and also eliminates any misassembly.

The manual valve 18 delivers fluid pressure through a passage 70 when the manual position selected is "D" or drive. The fluid in passage 70 is connected through an opening or lateral passage 72 with a chamber 74 surrounding the spring 52. This fluid pressure increases the seating force of the valve 48. The fluid in passage 70 is connected through an opening 76 in the separator plate 56 to a passage 78 formed in a valve body or housing 80.

The valve body 80 has formed therein a lateral passage 82 which communicates with an inlet chamber 84 disposed in fluid communication with the pintle portion 64 of the valve 50. When the fluid pressure in chamber 84 is sufficiently great to overcome the force in spring 54, the valve 50 will move away from the seat 60 thereby permitting fluid communication with chamber 85 surrounding the spring 54 and to a passage 86 formed in the valve body 68 and connected with the chamber 85.

The passage 86 is communicated with a chamber 88 and through a passage 90 in the separator plate 56 with a passage 92. The passage 92 is connected with the passage 46 which communicates with the clutch 24. The clutch 24 also communicates via passage 46 with a chamber 96 disposed adjacent or formed in the valve body 80 adjacent the pintle portion 64 of valve 48.

When the operator moves the manual valve from neutral to drive, a "garage shift" is accomplished. At this time, fluid pressure enters the passage 70 and then passes through 76, 78 and 82 to chamber 84. In chamber 84, the pressure causes the valve 50 to lift off the seat 60 thereby permitting fluid pressure to be directed to the clutch 24. This same fluid pressure is also connected with the chamber 96.

However, the valve 48 cannot be opened by this pressure due to the fact that the pressure below the valve in chamber 74 is equal to or greater than the pressure in chamber 96 and accordingly, the two pressures are balanced and the spring force holds the valve 48 closed. However, flow through the valve 50 will begin engagement of the clutch 24 which will be further explained later.

Figure 3:
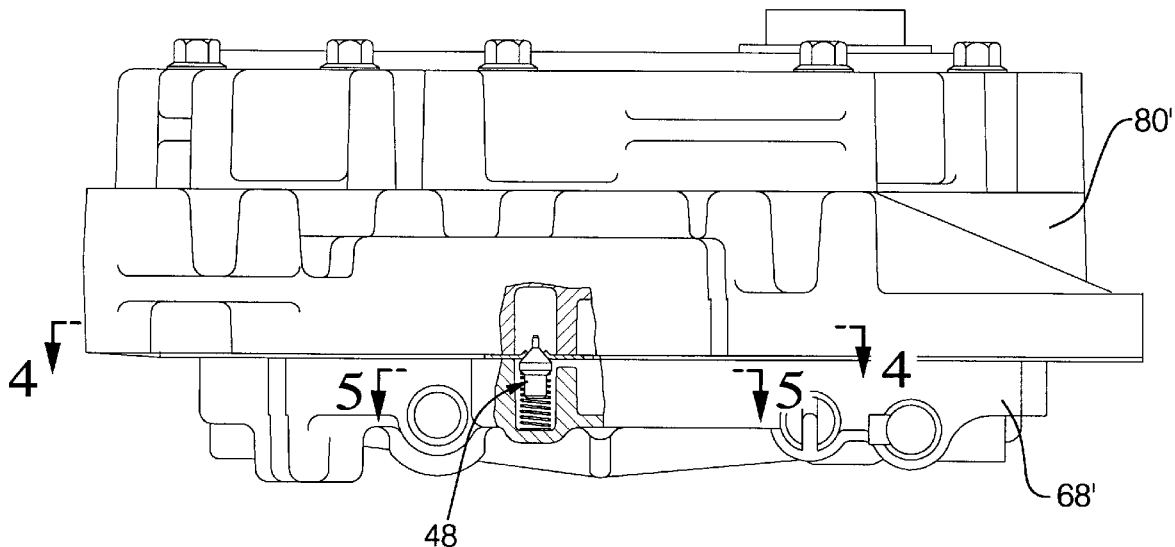
FIG. 3 is a side elevational view of a transmission valve body assembly.
Figure 4:
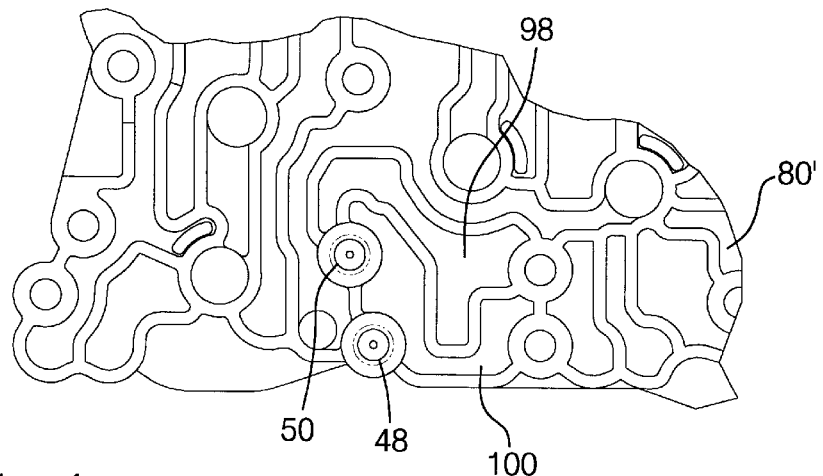
FIG. 4 is a view taken along line 4—4 of FIG. 3.
Figure 5:
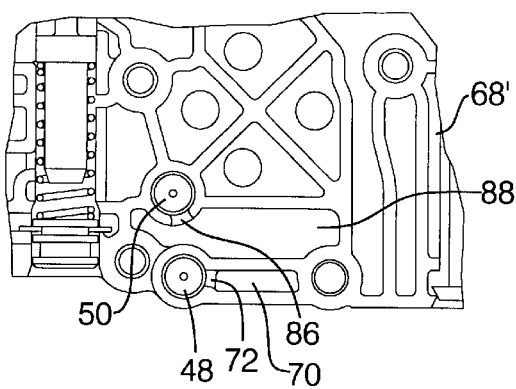
FIG. 5 is a view taken along line 5—5 of FIG. 3.

In FIG. 3, there is seen a valve assembly having a lower valve body 68' and an upper valve body 80'. The valve 48 is seen disposed in the valve body 68'. As seen in FIG. 4, the valve 48 and valve 50 can be communicated with various worm tracks, such as 98 and 100. The valve body 68', as seen in FIG. 5, also has passages or worm tracks, particularly 70, which communicates fluid pressure from the manual valve 18 to the spring area of valve 48 through the passage 72.

As above described, the clutch 24 will receive fluid pressure for engagement during a neutral to drive shift.

Figure 6:
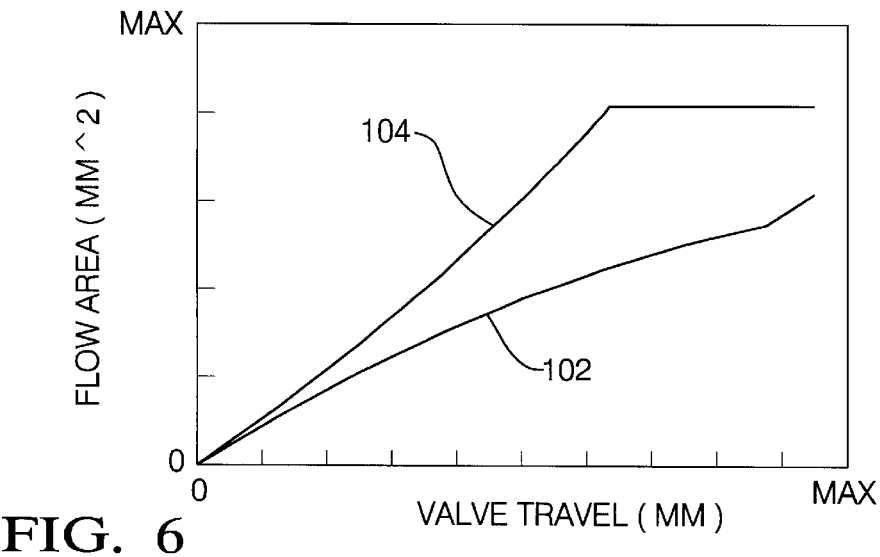
FIG. 6 is a curve representing the valve opening travel versus valve flow area.

In FIG. 6, there is seen a curve representing the flow area opening of a pintle valve versus valve travel at line 102 and a curve representing the flow area versus travel of a ball in a conventional ball valve at line 104. As can be seen, the flow area of the pintle valve on line 102 is less for a given amount of valve travel. Since the flow area is less, the flow through the valve will be less at a given pressure. A sample of this is shown in the curves shown in FIG. 7.

Figure 7:
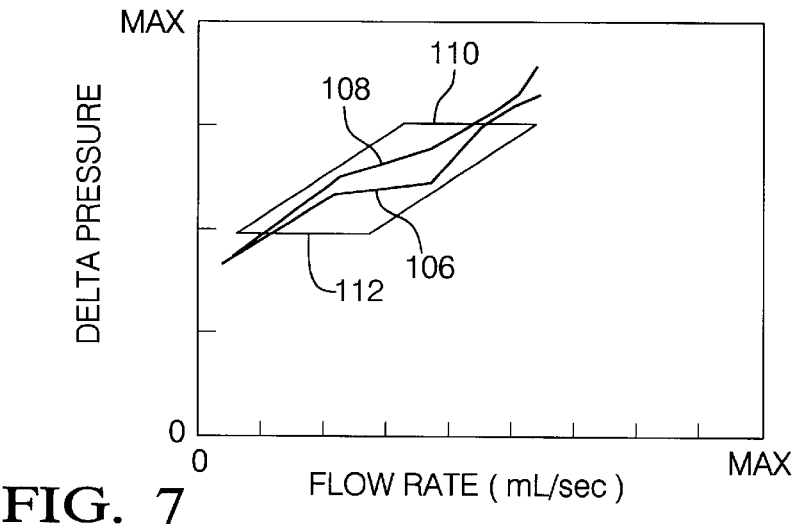
FIG. 7 is a curve representing fluid flow rate through a pintle valve versus pressure differential across the valve.

The curves in FIG. 7 represent the fluid flow rate through the pintle valve versus the pressure differential between the chamber 84 and the chamber 85 of valve 50. Curve 106 represents the fluid flow versus differential pressure when the transmission hydraulic system oil is relatively cold and curve 108 represents the relationship when the transmission is at a normal operating temperature. An upper line 110 represents the pressure differential across the valve 50 when the piston is beginning to stroke the return spring and line 112 represents the pressure differential at the valve when the shift is completed.

As can be seen, initially the pressure differential is high when the valve 50 opens. However, with the flow rate given to the piston quickly begins to stroke and the pressure differential in the valve 50 increases, such that the flow rate decreases along the line 108 when the system is hot and along the line 106 when the system is cold. One viewing these curves should readily ascertain that the fluid flow rate from the valve 50 to the clutch 24 steadily decreases as the clutch engagement is brought to completion. This is contrasted with the curves shown in FIG. 8 which represent a prior art ball type check valve used in some transmissions today. Curve 114 represents the system when it is at operating temperature and curve 116 represents the system when it is cold.

As can be readily ascertained from these curves, the pressure differential across the valve feeding the clutch will never be sufficient to reach line 118 which represents the pressure differential one would expect when the piston is beginning to stroke against the return spring. Because of this, the fluid flow into the housing 36 remains at a very high flow rate until the pressure differential across the incoming or engaging valve is increased significantly. When this occurs, the flow rate then increases at a fairly constant differential pressure until the point 120 is reached, at which time the flow rate is reduced at a more rapid pace and the clutch engagement is complete.

Figure 8:
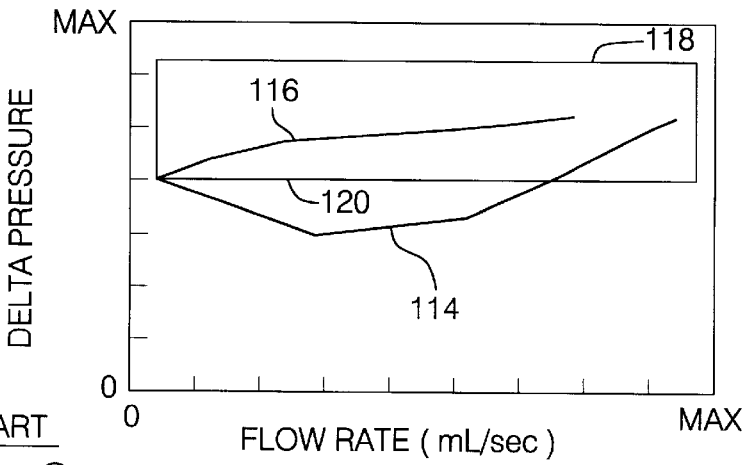
FIG. 8 is a view similar to FIG. 7 showing the flow rate versus pressure differential for a prior art ball type valve.

There is no time scale on these curves in FIGS. 7 and 8. However, it should be evident to one skilled in the art that with the high flow rates accompanying the valve opening in FIG. 8 that the clutch will be fully stroked in a much shorter period of time than the valve control shown in FIG. 7. This short engagement period is what can produce harshness or feel within the transmission during the neutral to drive shift. It is precisely this feel that the present invention seeks to overcome and remove from the system. It does so very effectively with the valve 50.

Likewise, the valve 48 will control clutch disengagement in pretty much the same manner. During clutch disengagement, the passage 70 is exhausted by the manual valve 18 such that the pressure in chamber 96 will cause an opening of the valve 48 such that initially a large pressure differential will occur and a high flow rate will be initially available. However, as the pressure differential reduces, the flow rate will also reduce thereby cushioning the disengagement time of the clutch 24. This provides for a smooth transition from neutral to drive and from drive to neutral.

The valve assembly disclosed herein has been found to be especially useful in hydraulic systems such as that described in U.S. Pat. No. 4,756,213 issued Jul. 12, 1988, to Mainquist et al. and assigned to the assignee of the present application.

We claim:

1. A hydraulic control for a power transmission comprising:
   a source of hydraulic pressure;
   a hydraulically operated torque transmitting ratio controller;
   a valve positionable to direct hydraulic pressure from said source to said ratio controller;
   a valve body supporting said valve;
   a housing supporting fluid flow to and from said ratio controller;
   a separator plate disposed between said valve body and said housing for directing the flow of hydraulic fluid therebetween, said separator plate defined by spaced parallel planes, said separator plate having an opening defining a conical valve seat formed thereon with material displaced from said spaced parallel planes; and
   a spring loaded pintle valve having a conical valve portion urged into contact with said conical seat and a pintle portion extending through said opening, said pintle valve being responsive to hydraulic pressure from said valve to control hydraulic flow to said ratio controller.

2. A hydraulic control for a power transmission comprising:
   a source of hydraulic pressure;
   a hydraulically operated ratio controller comprising a friction torque transmitting device having a pressure responsive piston;
   valve means selectively positionable to direct hydraulic pressure from said source to said piston of said ratio controller;
   a valve body slidably supporting said valve means;
   a housing having passages for supplying hydraulic fluid to said ratio controller;
   a separator plate disposed between said valve body and said housing for supplying hydraulic fluid to said ratio controller, said separator plate having upper and lower surfaces defined by spaced parallel planes, said separator plate having an opening defining a conical valve seat formed thereon with material of one of said upper and lower surfaces displaced from said spaced parallel planes; and
   a spring loaded pintle valve having a conical valve portion urged into contact with said conical seat by a spring and a pintle portion extending through said opening, said pintle valve being responsive to hydraulic pressure from said valve means to control hydraulic flow to said piston.

* * * * *